US011714226B2

(12) United States Patent
Tamura et al.

(10) Patent No.: US 11,714,226 B2
(45) Date of Patent: Aug. 1, 2023

(54) OPTICAL FIBER

(71) Applicant: SUMITOMO ELECTRIC INDUSTRIES, LTD., Osaka (JP)

(72) Inventors: Yoshiaki Tamura, Osaka (JP); Yuki Kawaguchi, Osaka (JP); Hirotaka Sakuma, Osaka (JP); Masato Suzuki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 16 days.

(21) Appl. No.: 17/601,569

(22) PCT Filed: Apr. 6, 2020

(86) PCT No.: PCT/JP2020/015564
§ 371 (c)(1),
(2) Date: Oct. 5, 2021

(87) PCT Pub. No.: WO2020/209229
PCT Pub. Date: Oct. 15, 2020

(65) Prior Publication Data
US 2022/0206214 A1  Jun. 30, 2022

(30) Foreign Application Priority Data

Apr. 10, 2019 (JP) ................ 2019-074782

(51) Int. Cl.
*G02B 6/02* (2006.01)
*G02B 6/036* (2006.01)

(52) U.S. Cl.
CPC ......... *G02B 6/02395* (2013.01); *G02B 6/036* (2013.01); *G02B 6/03622* (2013.01); *G02B 6/03694* (2013.01)

(58) Field of Classification Search
CPC ............... G02B 6/02395; G02B 6/036; G02B 6/03622; G02B 6/03694
See application file for complete search history.

(56) References Cited

U.S. PATENT DOCUMENTS 8,798,420 B2 *  8/2014  Yonezawa ................ G02B 6/02
                                                         385/123
9,036,972 B2 *  5/2015  Tamura ............... G02B 6/03694
                                                         65/435
(Continued)

FOREIGN PATENT DOCUMENTS

CN    100545113 C    9/2009
CN    103308979 A    9/2013
(Continued)

*Primary Examiner* — Ryan A Lepisto
(74) *Attorney, Agent, or Firm* — Faegre Drinker Biddle & Reath LLP

(57) ABSTRACT

An optical fiber has a structure uniform in a longitudinal direction. This optical fiber includes a core and a cladding that surrounds the core in a cross-section perpendicular to the longitudinal direction. A refractive index of the cladding is lower than a refractive index of the core. The cladding has, in the cross-section, an inner cladding layer including an inner circumferential surface of the cladding, and an outer cladding layer including an outer circumferential surface of the cladding. The inner cladding layer contains fluorine. The inner and outer cladding layers have refractive indexes different from each other. The outer cladding layer includes a local maximum portion where a residual stress, which is a tensile stress, becomes local maximum. A radial distance between the local maximum portion and an inner circumferential surface of the outer cladding layer is 10 μm or less.

14 Claims, 24 Drawing Sheets

(56) References Cited

U.S. PATENT DOCUMENTS

| | | |
|---|---|---|
| 2013/0148934 A1 | 6/2013 | Nakanishi et al. |
| 2013/0243379 A1 | 9/2013 | Yonezawa et al. |
| 2014/0254997 A1 | 9/2014 | Tamura et al. |
| 2015/0241629 A1 | 8/2015 | Tamura et al. |
| 2017/0038528 A1 | 2/2017 | Hoshino |
| 2018/0251397 A1 | 9/2018 | Yan et al. |
| 2020/0393613 A1 | 12/2020 | Tamura et al. |

FOREIGN PATENT DOCUMENTS

| | | |
|---|---|---|
| JP | 2006-058494 A | 3/2006 |
| JP | 2013-107792 A | 6/2013 |
| JP | 2013-122502 A | 6/2013 |
| JP | 2015-157726 A | 9/2015 |
| WO | WO-2005/021455 A2 | 3/2005 |
| WO | WO-2019/172197 A1 | 9/2019 |

* cited by examiner

*Fig.3A*

| ALKALI CONCENTRATION (ppm) | FIRST RESIDUAL STRESS DIFFERENCE (Mpa) | TRANSMISSION LOSS AT WAVELENGTH OF 1550 nm (dB/km) |
|---|---|---|
| 30 | 5 | 0.148 |
| 20 | 10 | 0.148 |
| 5 | 13 | 0.148 |
| 1 | 15 | 0.148 |
| 0.5 | 18 | 0.153 |
| 0.2 | 25 | 0.158 |
| 0.1 | 32 | 0.163 |
| 0 | 48 | 0.180 |

Fig.4A

| DRAWING TENSION (g) | FIRST RESIDUAL STRESS DIFFERENCE (Mpa) |
|---|---|
| 10 | 3 |
| 20 | 4 |
| 30 | 5 |
| 50 | 10 |
| 100 | 15 |
| 120 | 20 |
| 150 | 50 |
| 200 | 120 |

Fig.5A

| ALKALI CONCENTRATION (ppm) | MAXIMUM DRAWING TENSION (g) |
|---|---|
| 1 | 100 |
| 15 | 130 |
| 30 | 150 |
| 70 | 160 |

*Fig.6A*

| DRAWING TENSION (g) | TRANSMISSION LOSS AT WAVELENGTH OF 1550 nm (dB/km) | |
|---|---|---|
| | ALKALI CONCENTRATION 1ppm | ALKALI CONCENTRATION 30ppm |
| 10 | 0.158 | 0.158 |
| 20 | 0.15 | 0.15 |
| 30 | 0.148 | 0.147 |
| 50 | 0.148 | 0.147 |
| 100 | 0.148 | 0.147 |
| 120 | 0.15 | 0.148 |
| 150 | 0.158 | 0.148 |
| 200 | 0.165 | 0.152 |

Fig.7A

| RADIAL POSITION OF STRESSED PORTION (μm) | TRANSMISSION LOSS AT WAVELENGTH OF 1550 nm (dB/km) |
|---|---|
| 5 | 0.148 |
| 10 | 0.148 |
| 20 | 0.153 |
| 35 | 0.154 |
| 50 | 0.162 |

Fig.8A

| RESIDUAL STRESS PEAK VALUE OF OUTER CLADDING LAYER (MPa) | INCREASE IN HYDROGEN LOSS (dB/km) |
|---|---|
| -5 | 0.5 |
| 0 | 0.1 |
| 5 | 0 |
| 15 | 0 |
| 20 | 0 |
| 30 | 0 |
| 50 | 1 |

*Fig.10A*

| OH CONCENTRATION (ppm) | SECOND RESIDUAL STRESS DIFFERENCE (MPa) |
|---|---|
| 0 | 5 |
| 0.5 | 5 |
| 1 | 5 |
| 2 | 3 |
| 5 | 2 |
| 10 | 0 |
| 13 | -5 |
| 20 | -6 |
| 35 | -8 |

Fig.11A

| DIFFERENCE IN F CONCENTRATION (ppm) | PEAK VALUE OF RESIDUAL STRESS (MPa) | TRANSMISSION LOSS AT 1550 nm (dB/km) |
|---|---|---|
| 0 | 0 | 0.156 |
| 50 | 0 | 0.156 |
| 100 | 5 | 0.148 |
| 500 | 10 | 0.148 |
| 1000 | 22 | 0.148 |
| 2000 | 28 | 0.148 |
| 3000 | 30 | 0.153 |
| 5000 | 33 | 0.158 |

Fig.12A

| INTEGRATED RESIDUAL STRESS VALUE (Mpa·μm) | TRANSMISSION LOSS (dB/km) |
|---|---|
| 9 | 0.158 |
| 20 | 0.148 |
| 32 | 0.148 |
| 45 | 0.148 |
| 63 | 0.148 |
| 81 | 0.148 |
| 98 | 0.148 |
| 115 | 0.148 |
| 120 | 0.153 |
| 132 | 0.158 |
| 160 | 0.163 |

OPTICAL FIBER

TECHNICAL FIELD

The present disclosure relates to an optical fiber.

The present application claims the benefit of the priority based on Japanese Patent Application No. 2019-074782, filed on Apr. 10, 2019, the entire contents disclosed in the application is incorporated herein by reference.

BACKGROUND ART

An optical fiber for long-distance optical communication is made of silica glass and is manufactured through a drawing process. In the drawing process, a glass preform (preform) as the source of the optical fiber is simultaneously heated and fibrously stretched such that a tensile tension of 50 gf (0.49 N) or more is applied to the glass. An optical fiber in which an alkali metal element has been added to a core portion is known as an optical fiber for long-distance optical communication requiring transmission loss reduction (see, for example, Patent Literature 1 and Patent Literature 2).

CITATION LIST

Patent Literature

Patent Literature 1: Japanese Unexamined Patent Publication No. 2015-157726
Patent Literature 2: Japanese Unexamined Patent Publication No. 2013-107792

SUMMARY OF INVENTION

An optical fiber of the present disclosure has a structure uniform in a longitudinal direction. The optical fiber includes: a core that includes a silica glass containing an alkali metal element; and a cladding that includes a silica glass and surrounds the core in a cross-section perpendicular to the longitudinal direction. A refractive index of the cladding is lower than a refractive index of the core. The cladding includes, in the cross-section, an inner cladding layer having a circular ring shape and including an inner circumferential surface of the cladding, and an outer cladding layer having a circular ring shape and including an outer circumferential surface of the cladding. The inner cladding layer contains fluorine. The inner and outer cladding layers have refractive indexes different from each other. The outer cladding layer includes a local maximum portion where a residual stress, which is a tensile stress, becomes local maximum. A radial distance between the local maximum portion and an inner circumferential surface of the outer cladding layer is 10 μm or less. It should be noted that the optical fiber is assumed to be axisymmetric around a longitudinally extending central axis unless otherwise noted in this specification.

BRIEF DESCRIPTION OF DRAWINGS

FIG. 3A is a table showing the relationship between alkali concentration, a first residual stress difference, and transmission loss at a wavelength of 1550 nm.
FIG. 4A is a table showing the relationship between drawing tension and the first residual stress difference.
FIG. 5A is a table showing the relationship between the alkali concentration and the maximum drawing tension.
FIG. 6A is a table showing the drawing tension-transmission loss relationship at an alkali concentration of 1 ppm and an alkali concentration of 30 ppm.
FIG. 7A is a table showing the relationship between the radial position of a stressed portion and the transmission loss at a wavelength of 1550 nm.
FIG. 8A is a table showing the relationship between a peak value of the residual stress in an outer cladding layer and an increase in hydrogen loss.
FIG. 10A is a table showing the relationship between the OH concentration in a first region and a second residual stress difference.
FIG. 11A is a table showing the relationship between a difference in fluorine concentration, the peak value of residual stress, and the transmission loss at 1550 nm.
FIG. 12A is a table showing the relationship between an integrated residual stress value and the transmission loss.

DESCRIPTION OF EMBODIMENTS

Figure 1:
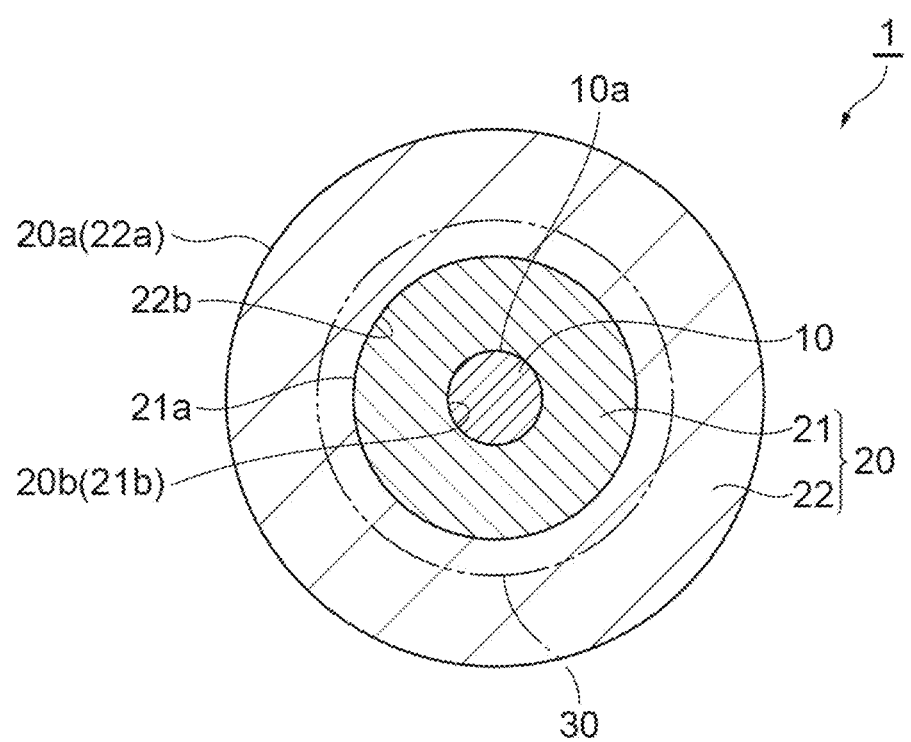
FIG. 1 is a diagram illustrating a cross-sectional view of an optical fiber according to an embodiment.

Problem to be Solved by Present Disclosure

In the drawing process, the viscosity of the optical fiber has non-uniformity attributable to the composition or temperature distribution in the cross-section, and thus tensile tension is more likely to be generated in the high-viscosity region than in the low-viscosity region in the cross-section of the optical fiber. In some cases, this tensile tension results in strain in the molecular structure of the glass and strain-derived scattering and glass defect loss. The transmission performance of the optical fiber declines when such scattering and glass defect loss occur in the core or the cladding near the core. Methods for suppressing such a decline in transmission performance include suppressing the occurrence of strain by adding an alkali metal element which lowers the viscosity to the core portion. However, in some cases, scattering loss attributable to strain occurs even in an optical fiber having an alkali metal element-added core portion. For example, in an optical fiber in which transmission loss attributable to $GeO_2$ addition is suppressed by adding fluorine (F), which decreases a refractive index, to a cladding instead of adding $GeO_2$, which increase the refractive index, to a core, F added to the cladding also lowers the viscosity, and thus tensile tension and strain may occur in the core or the cladding near the core.

Therefore, an object of the present disclosure is to provide an optical fiber capable of reducing transmission loss.

Effect of Present Disclosure

According to the present disclosure, an optical fiber capable of reducing transmission loss can be provided.

Description of Embodiment Of Present Disclosure

First, an embodiment of the present disclosure will be listed and described. The optical fiber according to the embodiment has a structure uniform in the longitudinal direction. The optical fiber includes: a core that includes a silica glass containing an alkali metal element; and a cladding that includes a silica glass and surrounds the core in a cross-section perpendicular to the longitudinal direction. A refractive index of the cladding is lower than a refractive index of the core. The cladding has, in the cross-section, an inner cladding layer having a circular ring shape and including an inner circumferential surface of the cladding, and an outer cladding layer having a circular ring shape and including an outer circumferential surface of the cladding. The inner cladding layer contains fluorine. The inner and outer cladding layers have refractive indexes different from each other. The outer cladding layer includes a local maximum portion where a residual stress, which is a tensile stress, becomes local maximum. A radial distance between the local maximum portion and an inner circumferential surface of the outer cladding layer is 10 μm or less.

In the optical fiber according to the above embodiment, a glass defect can be actively generated and environment-derived hydrogen and the glass defect are capable of reacting to each other in the local maximum portion. As a result, transmission loss deterioration attributable to hydrogen which is generated by the reaction between the environment-derived hydrogen and the glass defect is suppressed in the core. Accordingly, the transmission loss can be reduced. Hereinafter, the transmission loss deterioration attributable to the hydrogen is abbreviated as "hydrogen deterioration".

An increase in transmission loss at a wavelength of 1380 nm resulting from 24-hour exposure to an atmosphere containing hydrogen gas 1 kPa in partial pressure at a temperature of 80° C. may be 0.0001 dB/km or more and 0.1 dB/km or less. In this case, the hydrogen deterioration is suppressed, and thus the transmission loss can be reliably reduced. In addition, the optical fiber can be used without causing loss deterioration even in hydrogen of higher concentration, and thus more cable material options are given in terms of the amount of hydrogen generation. As a result, cable costs can be reduced.

The residual stress in the local maximum portion may be a tensile stress of 5 MPa or more and 30 MPa or less. In this case, the transmission loss is further reduced.

The outer cladding layer may have a first region including the inner circumferential surface of the outer cladding layer. The first region may have a radial thickness of 10 μm. The first region may have an OH concentration of 5 ppm or less. In this case, the local maximum portion with tensile tension is reliably formed in the first region, and thus the transmission loss can be reliably reduced.

The outer cladding layer may have a second region including the inner circumferential surface of the outer cladding layer. The second region may have a radial thickness of 0.1 μm or more and less than 3 μm. A fluorine concentration in the second region may be lower by 100 ppm or more and 10000 ppm or less than a fluorine concentration in a region of the outer cladding layer other than the second region. In this case as well, the local maximum portion with tensile tension is reliably formed in the second region or a region including the second region, and thus the transmission loss can be reliably reduced. It should be noted that a region including the inner circumferential surface of the outer cladding layer may be the first region and the second region in the outer cladding layer.

A value obtained by integrating a residual stress expressed as a function of a radial distance from a central axis of the optical fiber over the radial distance in a section between an upper limit position and a lower limit position sandwiching the local maximum portion may be 20 MPa·μm or more and less than 120 MPa·μm, a distance from the inner circumferential surface of the outer cladding layer being 10 μm at the upper limit position and a residual stress equal to a residual stress at the upper limit position being given at the lower limit position. In this case, the transmission loss is further reduced.

Details of Embodiment of Present Disclosure

Specific examples of the optical fiber of the present disclosure will be described below with reference to the drawings. It should be noted that the present invention is not limited to these exemplifications, is indicated by the claims, and is intended to include every change within the meaning and scope equivalent to the claims. The same elements in the description of the drawings are denoted by the same reference numerals with redundant description omitted.

FIG. 1 is a diagram illustrating a cross-sectional view of an optical fiber according to the embodiment. As illustrated in FIG. 1, an optical fiber 1 of the present embodiment includes a core 10 and a cladding 20. The cross-sectional view of FIG. 1 represents a cross-section perpendicular to the central axis (optical axis) of the optical fiber 1. The optical fiber 1 has a structure uniform in the longitudinal direction. Here, the uniform structure also includes a structure different in the range of a manufacturing error. In other words, the optical fiber 1 has a structure substantially uniform in the longitudinal direction.

The main component (base material) of the core 10 is silica glass containing an alkali metal element. Examples of the alkali metal element include sodium (Na), potassium (K), cesium (Cs), and rubidium (Rb). The core 10 is provided in, for example, a region including the central axis of the optical fiber 1. The core 10 has an outer circumferential surface 10a. The central axis of the core 10 is, for example, coincident with the central axis of the optical fiber 1. The outer diameter (core diameter) of the core 10 is, for example, 8 µm or more and 15 µm or less.

The main component (base material) of the cladding 20 is silica glass. The cladding 20 surrounds the core 10 and covers the outer circumferential surface 10a of the core 10 in the cross-section perpendicular to the central axis direction (longitudinal direction) of the optical fiber 1. The cladding 20 has an outer circumferential surface 20a and an inner circumferential surface 20b. The outer circumferential surface 20a constitutes the outer circumferential surface of the optical fiber 1. The inner circumferential surface 20b is in contact with the outer circumferential surface 10a of the core 10. The outer diameter (cladding diameter) of the cladding 20 is equal to the outer diameter (fiber diameter) of the optical fiber 1 and is, for example, 124 µm or more and 126 µm or less. The radial length (thickness) of the cladding 20 is, for example, 55 µm or more and 59 µm or less. Although the outer circumferential surface of the optical fiber 1 may be coated with an ultraviolet curable resin, the coating is omitted in the present specification and the accompanying drawings unless otherwise noted. As is known to those skilled in the art, with the coating, the occurrence of a scratch on the outer circumferential surface of the optical fiber 1 can be prevented and the rigidity of the optical fiber 1 can be optimized.

The cladding 20 has an inner cladding layer 21 and an outer cladding layer 22. In the cross-section perpendicular to the central axis direction (longitudinal direction) of the optical fiber 1, both the inner cladding layer 21 and the outer cladding layer 22 have a circular ring shape. The inner cladding layer 21 and the outer cladding layer 22 have refractive indexes different from each other. It should be noted that the cladding 20 may have a cladding layer other than the inner cladding layer 21 and the outer cladding layer 22 between the inner cladding layer 21 and the outer cladding layer 22 although the inner cladding layer 21 and the outer cladding layer 22 in the present embodiment are in contact with each other as will be described below.

The inner cladding layer 21 surrounds the core 10 and covers the outer circumferential surface 10a in the cross-section perpendicular to the central axis direction (longitudinal direction) of the optical fiber 1. The inner cladding layer 21 has an outer circumferential surface 21a and an inner circumferential surface 21b. The outer circumferential surface 21a is in contact with the outer cladding layer 22. The inner circumferential surface 21b of the inner cladding layer 21 constitutes the inner circumferential surface 20b of the cladding 20. In other words, the inner cladding layer 21 includes the inner circumferential surface 20b. The inner cladding layer 21 is the innermost cladding layer. The outer diameter of the inner cladding layer 21 is, for example, 20 µm or more and 70 µm or less. The radial thickness of the inner cladding layer 21 is, for example, 5 µm or more and 30 µm or less. In one example, the outer diameter of the inner cladding layer 21 is 35 µm and the radial thickness thereof is 12.5 µm.

The outer cladding layer 22 surrounds the inner cladding layer 21 and covers the outer circumferential surface 21a of the inner cladding layer 21 in the cross-section perpendicular to the central axis direction (longitudinal direction) of the optical fiber 1. The outer cladding layer 22 has an outer circumferential surface 22a and an inner circumferential surface 22b. The outer circumferential surface 22a constitutes the outer circumferential surface 20a of the cladding 20. In other words, the outer cladding layer 22 includes the outer circumferential surface 20a. The outer cladding layer 22 is the outermost cladding layer. The inner circumferential surface 22b of the outer cladding layer 22 is in contact with the outer circumferential surface 21a of the inner cladding layer 21. The outer diameter of the outer cladding layer 22 is equal to the outer diameter of the cladding 20. The radial thickness of the outer cladding layer 22 is, for example, 27 µm or more and 53 µm or less. In one example, the outer diameter of the inner cladding layer 21 is 35 µm and the thickness of the outer cladding layer 22 is 45 µm.

The outer cladding layer 22 has a first region including the inner circumferential surface 22b. The first region surrounds the inner cladding layer 21. The radial thickness of the first region is 10 µm. The residual stress in the first region is tensile stress. Unless particularly described, the residual stress in the present specification is the component in the central axis direction of the stress remaining after the fiber has been cooled to room temperature after drawing and acting on the cross-section perpendicular to the central axis direction (drawing direction of the fiber). The residual stress is represented by a positive sign in the case of tension and a negative sign in the case of compression. Although the residual stress is a radial-position function, unless otherwise noted, a value obtained by averaging in a region with a diameter of 1 µm, which is a typical residual stress measurement resolution, is defined as the value of the residual stress. Further, in a case where the direction of the residual stress is tension, the absolute value thereof is referred to as the tensile stress unless otherwise noted. The residual stress in the outer cladding layer 22 becomes local maximum in the first region. In other words, the outer cladding layer 22 includes a local maximum portion 30, where the residual stress is tensile stress and becomes local maximum, in the first region. The radial distance between the local maximum portion 30 and the inner circumferential surface 22b is 10 µm or less.

The residual stress in the local maximum portion 30 is, for example, a tensile stress of 5 MPa or more and 30 MPa or less. As will be described later, a deterioration of the transmission loss of the optical fiber 1 is suppressed by the local maximum portion 30 having a residual stress of 30 MPa or less. In addition, as will be described later, the hydrogen deterioration of the core 10 is suppressed by the local maximum portion 30 having a residual stress of 5 MPa or more. As a result of the hydrogen deterioration suppression, in the optical fiber 1, the increase in transmission loss at a wavelength of 1380 nm resulting from 24-hour exposure to an atmosphere containing hydrogen gas 1 kPa in partial pressure at a temperature of 80° C. is 0.1 dB/km or less. Although an increase in transmission loss of 0.0001 dB/km or more can occur, it is not an obstacle in many applications.

Hydrogen deterioration is known as a factor that exacerbates the transmission loss of an optical fiber. The hydrogen deterioration results from a reaction between a glass defect and an environment-derived hydrogen molecule. The environment-derived hydrogen molecule is hydrogen derived from an environment outside glass such as resin. The glass defect is generated by the glass undergoing tensile stress and the binding of glass molecules being cut as a result. The glass defect is known as a factor that exacerbates the transmission loss of an optical fiber over time in particular. The peak of the transmission loss at a wavelength of 1380 nm derived from the absorption of the OH group generated by the glass defect increases with time.

In the core 10, the tensile stress may increase the transmission loss due to a glass defect. Therefore, in the optical fiber 1, the local maximum portion 30 is provided as a stressed portion to which tensile stress has been applied and a glass defect is actively generated in the local maximum portion 30. As a result, the reaction between environment-derived hydrogen and the glass defect increases in the local maximum portion 30. It is conceivable that the outer cladding layer 22 provided with the local maximum portion 30 plays the role of a barrier layer with respect to the hydrogen deterioration of the core 10 and is capable of suppressing the hydrogen deterioration of the core 10. The local maximum portion 30 is provided at a position separated from the core 10 sufficiently to the extent that signal light is not affected even in view of the spread of the signal light, examples of which include a position where the radial distance from the center of the core 10 is 30 μm or more. In addition, in order to avoid thickening the outer diameter of the optical fiber 1 more than necessary, the local maximum portion 30 is provided at a position where the radial distance from the outer circumferential surface 10a of the core 10 is 60 μm or less.

In general, in order to confine and propagate light using a core, the refractive index of a cladding needs to be lower than the refractive index of the core. Conceivable to this end are a configuration in which the core contains a dopant that increases the refractive index, such as germanium (Ge), and a configuration in which the cladding contains a dopant that decreases the refractive index, such as fluorine (F). The latter configuration can also be applied to, for example, a pure silica core optical fiber containing no dopant in the core. A relative refractive index difference is defined by Expression (1), where $n_o$ denotes a refractive index of the pure silica glass and $n_i$ denotes a refractive index of the cladding.
[Expression 1]

$$\Delta\% = (N_1^2 - n_0^2)/2n_0^2 \times 100 \tag{1}$$

The optical fiber 1 of the present embodiment has the latter configuration described above, and F is contained in the entire cladding 20 by 1000 ppm or more and 100000 ppm or less. As a result, the refractive index of the cladding 20 is lower than the refractive index of the core 10. In the cladding 20, at least the inner cladding layer 21 contains F. The F concentration in the cladding 20 is the highest in the inner cladding layer 21. It should be noted that the F concentration in the present disclosure is expressed as a mass fraction of F, that is, the ratio of the mass of F to the total mass. The relative refractive index difference between the core 10 and the inner cladding layer 21 is 0.2% or more. It should be noted that the refractive index of the core 10 is equivalent to the refractive index of the pure silica core.

The OH concentration in the first region is 5 ppm or less. It should be noted that the OH concentration in the present disclosure is expressed as a mass fraction of OH, that is, the ratio of the mass of OH to the total mass. As a result, the local maximum portion 30 can be formed in the first region as will be described later. The OH concentration in the first region is, for example, the average OH concentration in the first region.

The outer cladding layer 22 has a second region including the inner circumferential surface 22b. The radial thickness of the second region is 0.1 μm or more and less than 3 μm. The F concentration in the second region is lower by 100 ppm or more and 10000 ppm or less than the F concentration in the region of the outer cladding layer 22 other than the second region. As a result, the local maximum portion 30 capable of suppressing the transmission loss of the optical fiber 1 can be formed as will be described later. It should be noted that the F concentration in the second region is, for example, the minimum value (lowest value) of the F concentration in the second region. The F concentration in the region of the outer cladding layer 22 other than the second region is, for example, the minimum value (lowest value) of the F concentration in the region of the outer cladding layer 22 other than the second region.

The value obtained by integrating the residual stress expressed as a function of the radial distance from the central axis of the optical fiber 1 over the radial distance in the section between the upper limit position and the lower limit position sandwiching the local maximum portion 30 is 20 MPa·μm or more and less than 120 MPa·μm. The integrated value is represented by the following Expression (2) where r denotes the radial distance from the central axis of the optical fiber 1, P(r) denotes the residual stress, and the integration section is from r1 to r2 in radial distance. r1 is the lower limit value of the radial distance, and r2 is the upper limit value of the radial distance.
[Expression 2]

$$\int_{r1}^{r2} P(r)dr \tag{2}$$

Here, the upper limit position of the integration section coincides with the outer edge of the first region and the radial distance between the upper limit position of the integration section and the inner circumferential surface 22b is 10 μm. In addition, the residual stresses at the lower limit position and the upper limit position of the integration section are equal to each other. In other words, P(r1) is equal to P(r2). By the integrated value in the integration section set in such a range being 20 MPa·μm or more and less than 120 MPa·μm, the local maximum portion 30 capable of suppressing the transmission loss of the optical fiber 1 can be formed as will be described later.

Figure 2A:
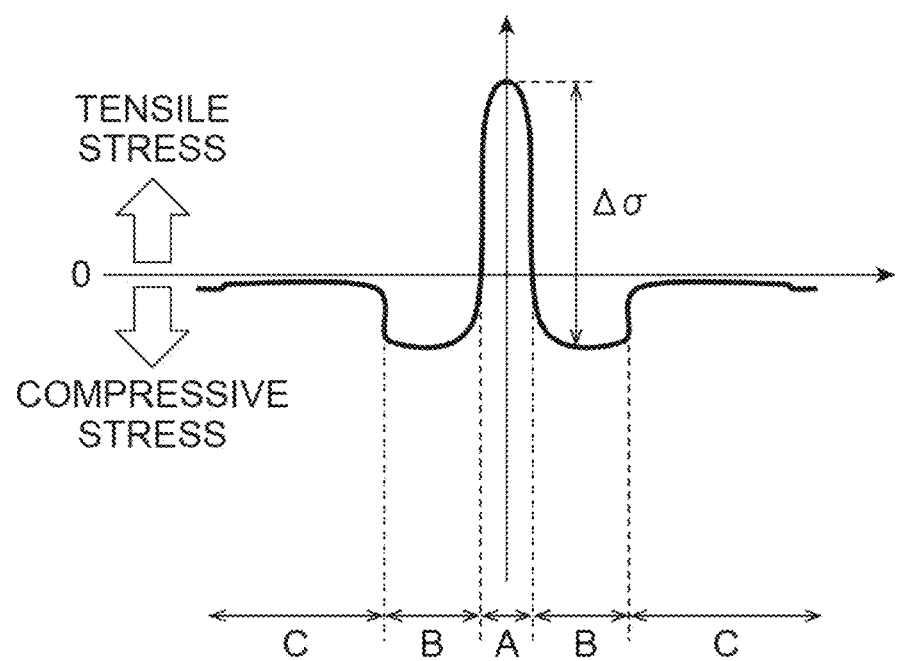
FIG. 2A is a graph showing the residual stress distribution in a case where a core does not contain an alkali metal element.
Figure 2B:
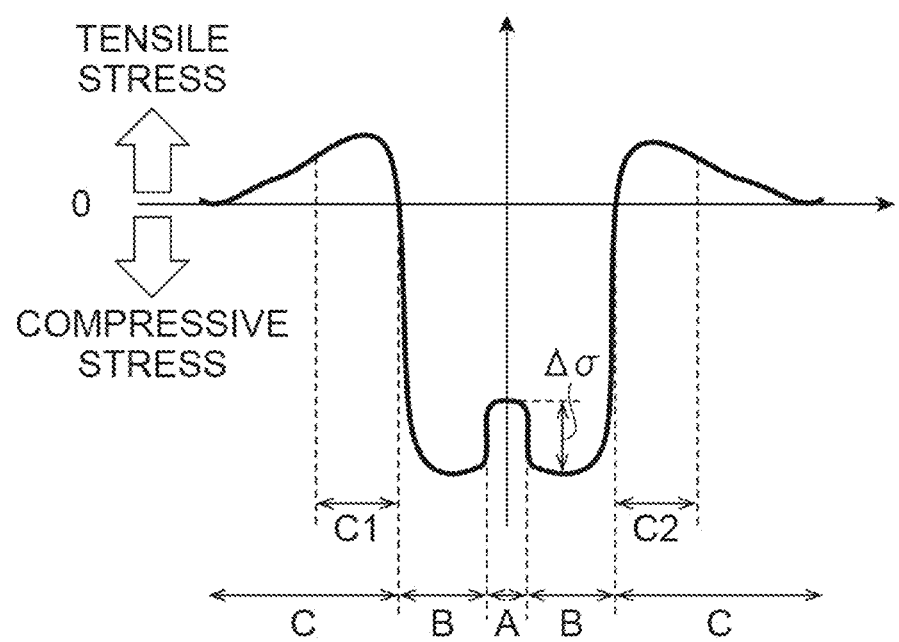
FIG. 2B is a graph showing the residual stress distribution in a case where the core contains an alkali metal element.

FIG. 2A is a graph showing the residual stress distribution in a case where a core does not contain an alkali metal element. FIG. 2B is a graph showing the residual stress distribution in a case where the core contains an alkali metal element. In FIGS. 2A and 2B, + indicates tensile stress and − indicates compressive stress with regard to residual stress. In FIGS. 2A and 2B, "A" indicates a part corresponding to the core, "B" indicates a part corresponding to the inner cladding layer, "C" indicates a part corresponding to the outer cladding layer, "C1" and "C2" indicate parts corresponding to the first region, and "Δσ" indicates a first residual stress difference. The first residual stress difference is the difference between the residual stress in the core and the residual stress in the inner cladding layer (value obtained by subtracting the residual stress in the inner cladding layer from the residual stress in the core).

Expected from the graphs shown in FIGS. 2A and 2B is that the viscosity of the core portion decreases since the core contains the alkali metal element, the stress in the core becomes compressive stress, and strain attributable to tensile stress is unlikely to occur in the core as a result. The first residual stress difference decreases by the core containing the alkali metal element. However, as shown in FIG. 2B, it is not the core but the inner cladding layer outside the core where the residual stress becomes lowest even in a case where the viscosity of the core portion has been reduced. Accordingly, it can be seen that the residual stress in the core may jump out to the tensile stress side when compared to the residual stress in the inner cladding layer although the residual stress in the core is within a range in which it does not become tensile stress.

The following is conceivable as to why the residual stress in the core jumps out to the tensile stress side. In other words, the alkali metal element diffuses to the cladding portion depending on manufacturing conditions such as the speed of drawing and the addition concentration of the alkali metal element. As a result, the inner cladding layer contains both the alkali metal element and the maximum concentration of F. The viscosity becomes lowest in such an inner cladding layer. The core portion is relatively hard, and thus it is conceivable that tensile stress may be applied in the process of fiber cooling in the drawing process.

Figure 3B:
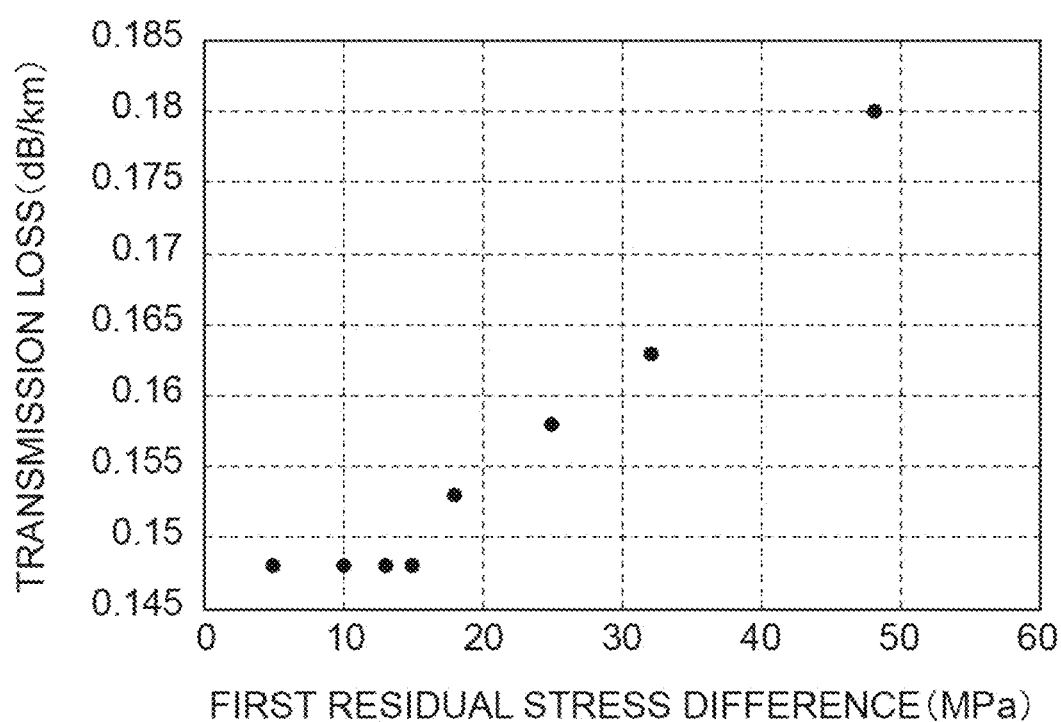
FIG. 3B is a graph showing the relationship between the first residual stress difference and the transmission loss at a wavelength of 1550 nm.

Next, the relationship between the first residual stress difference and the transmission loss was examined by changing the first residual stress difference by changing alkali concentration. The alkali concentration is the average alkali metal element concentration in the core. It should be noted that the alkali metal element concentration in the present disclosure is expressed as a mass fraction of the alkali metal element, that is, the ratio of the mass of the alkali metal element to the total mass. FIG. 3A is a table showing the relationship of the alkali concentration, the first residual stress difference, and the transmission loss at a wavelength of 1550 nm. FIG. 3B is a graph showing the relationship between the first residual stress difference and the transmission loss at a wavelength of 1550 nm. Here, the diameter (addition diameter) of the region where the alkali metal element exists in the core portion in the pre-drawing preform stage is 20% of the core diameter.

The synthesis of the core portion to which the alkali metal element has been added is carried out by, for example, a diffusion method with reference to the method of Patent Literature 1. The diffusion method is a method for diffusing and adding an alkali metal element into glass by performing heating from the outside while supplying alkali vapor to a glass pipe prepared in advance. The addition diameter can be adjusted by, for example, applying glass containing no alkali metal element, which becomes a second core portion, to the outside of the core portion by the collapse method. The addition diameter can also be adjusted by scraping the core portion to which the alkali metal element has been added.

Here, K was added as an alkali metal element. In a case where an alkali metal element other than K is added, the first residual stress difference can be made almost equal to that in a case where K has been added by changing the addition diameter in accordance with the diffusion rate of the alkali metal element. For example, in a case where an optical fiber was manufactured by adding Rb as an alkali metal element with the addition diameter at 80%, the first residual stress difference reached 15 MPa and the transmission loss also became equal to that in a case where K was added. From this, it is conceivable that there is a correlation between the first residual stress difference and the transmission loss regardless of the added element.

From the table and graph shown in FIGS. 3A and 3B, it can be seen that the transmission loss deteriorates in a case where the first residual stress difference exceeds 15 MPa. Due to an insufficient measurement accuracy, it is difficult to measure the first residual stress difference that is less than 5 MPa. However, the difference between the viscosity of the core portion and the viscosity of the inner cladding layer decreases as the first residual stress difference decreases, and thus it is conceivable that the transmission loss can be reduced.

Figure 4B:
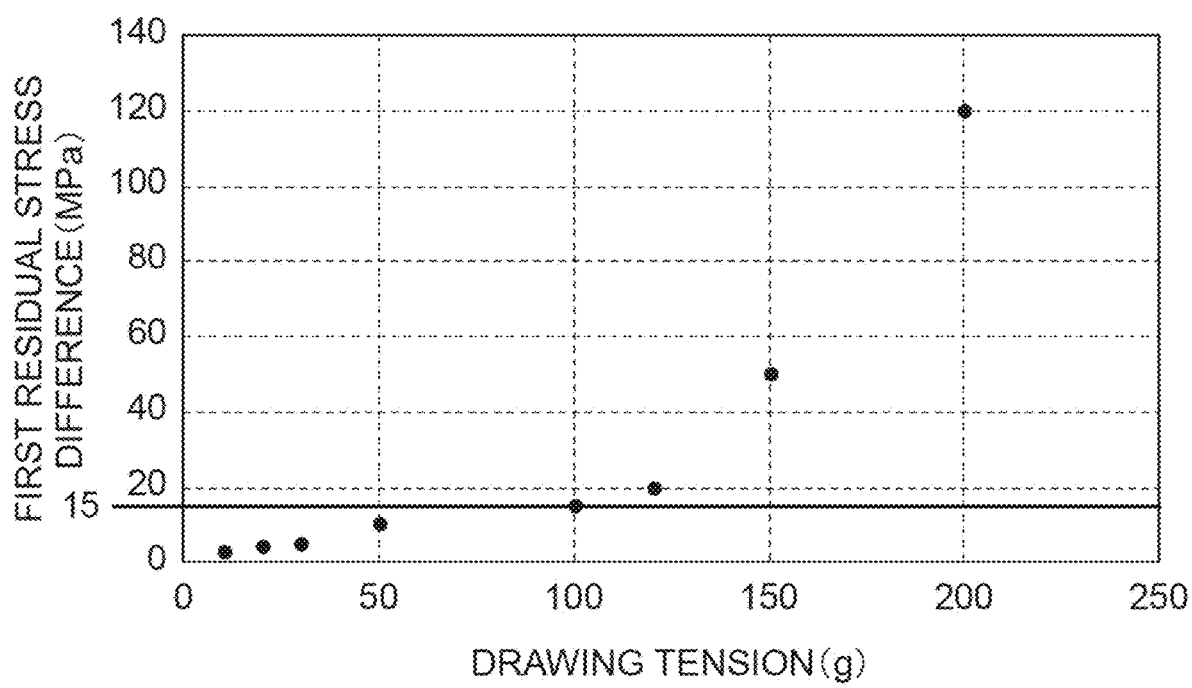
FIG. 4B is a graph showing the relationship between the drawing tension and the first residual stress difference.

For example, a method for keeping drawing tension low is conceivable as a method for preventing tensile stress from being applied to the core as described above. FIG. 4A is a table showing the relationship between the drawing tension and the first residual stress difference. The drawing tension is the tension that is applied to the glass part during drawing. FIG. 4B is a graph showing the relationship. Here, a preform with an alkali concentration of 1 ppm was used.

From the table and graph shown in FIGS. 4A and 4B, it can be seen that the first residual stress difference can be 15 MPa or less by the drawing tension being 100 g or less. In a case where the alkali concentration is high, it is conceivable that the first residual stress difference that is 15 MPa or less can be achieved in a wider drawing tension range. For example, the first residual stress difference at 30 ppm can be 15 MPa or less even at a drawing tension of 150 g and the first residual stress difference at 15 ppm can be 15 MPa or less even at a drawing tension of 130 g. In this manner, there is a positive correlation between the alkali concentration and the maximum value of the drawing tension (maximum drawing tension) at which the first residual stress difference is 15 MPa or less.

Figure 5B:
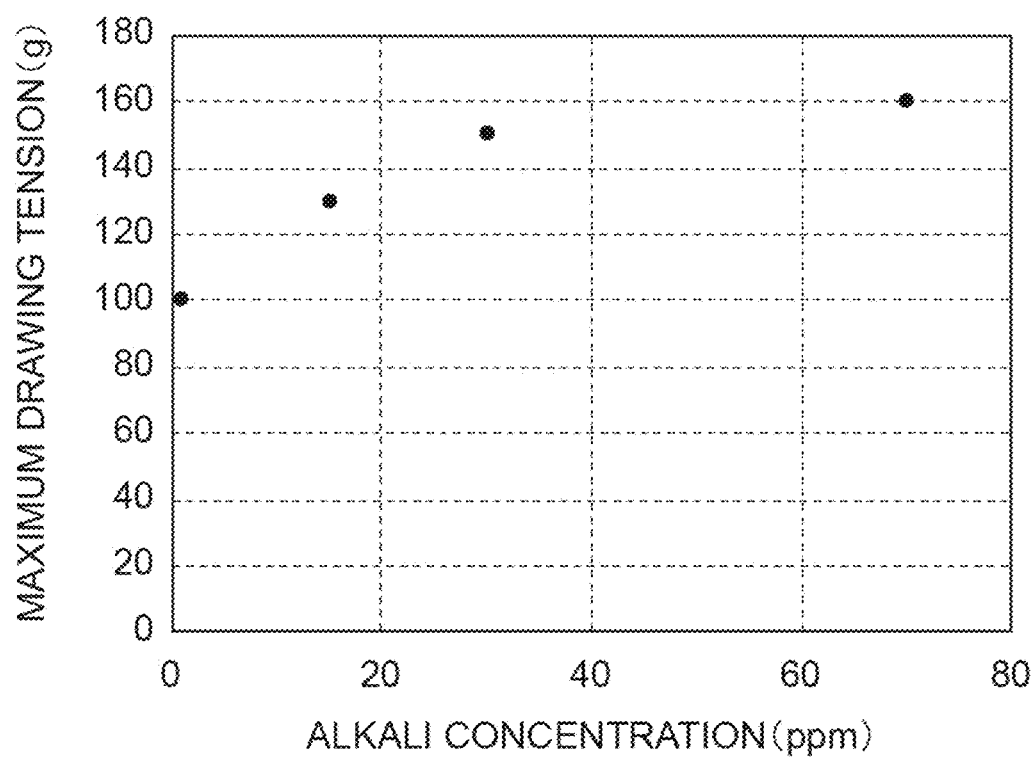
FIG. 5B is a graph showing the relationship between the alkali concentration and the maximum drawing tension.

FIG. 5A is a table showing the relationship between the alkali concentration and the maximum drawing tension (that is, the alkali concentration dependence of the maximum drawing tension). FIG. 5B is a graph showing the relationship. From the table and graph shown in FIGS. 5A and 5B, it is presumed that the first residual stress difference that is 15 MPa or less can be achieved regardless of the alkali concentration when the drawing tension is 100 g or less.

Figure 6B:
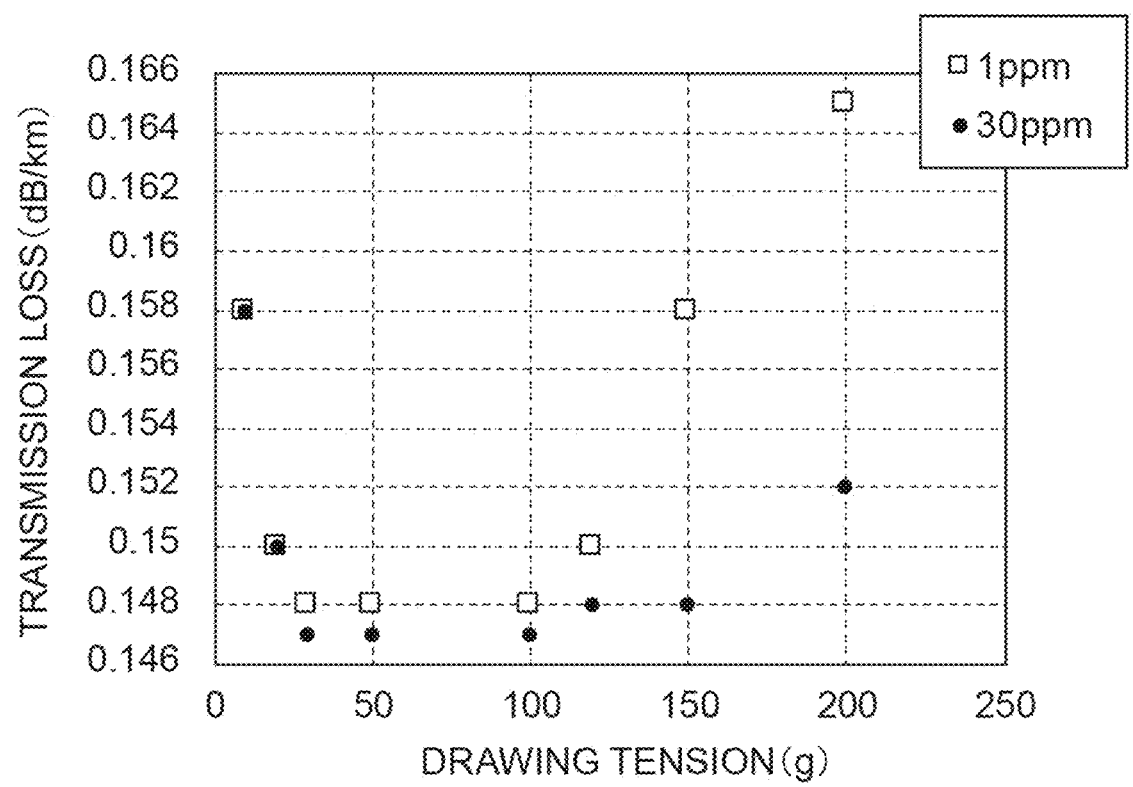
FIG. 6B is a graph showing the drawing tension-transmission loss relationship at an alkali concentration of 1 ppm and an alkali concentration of 30 ppm.

FIG. 6A is a table showing the drawing tension-transmission loss relationship at an alkali concentration of 1 ppm and an alkali concentration of 30 ppm. FIG. 6B is a graph showing the relationship. As shown in FIGS. 6A and 6B, the transmission loss increases rapidly regardless of the alkali concentration when the drawing tension is less than 20 g. When the drawing tension is too low, the fiber vibrates in the drawing process, and thus and the fiber diameter is not stable. As a result, it is presumed that the transmission loss has deteriorated. Accordingly, the drawing tension of an optical fiber with an alkali concentration of 1 ppm or more can be set to 20 g or more and 100 g or less regardless of the alkali concentration.

However, it is necessary to raise the heating temperature of the preform or reduce the drawing speed in order to carry out the drawing process at such a low drawing tension. Accordingly, a decline in production efficiency may arise. In this regard, in the optical fiber 1 according to the present embodiment, the plurality of cladding layers constitute the cladding 20 and the outer cladding layer 22, which is the outermost cladding layer, functions as a stressed layer to which tensile stress has been applied. For example, the viscosity of the outer cladding layer 22 can be increased and the outer cladding layer 22 is capable of functioning as the stressed layer by lowering the F concentration in the outer cladding layer 22. In addition, the outer cladding layer 22 has an interface with a different viscosity, and thus alkali metal element diffusion can be suppressed (see Patent Literature 2).

The occurrence of strain in the core can be suppressed in a case where the residual stress in the outer cladding layer is uniform (flat) over the entire outer cladding layer (for example, in a case where the difference between the maximum value and the minimum value of the residual stress in the outer cladding layer is 5 MPa or less). However, a barrier layer cannot be formed against the glass defect loss to be described later. Accordingly, the transmission loss increases due to the glass defect.

For example, in a case where F-free pure silica forms the outer cladding layer, the residual stress becomes tensile stress in the entire outer cladding layer. Accordingly, tensile force dispersion occurs over the entire outer cladding layer and the tensile stress per cross-sectional area decreases. Accordingly, in the outer cladding layer, the residual stress becomes a low tensile stress, the peak (local maximum) of the residual stress is not formed, and the barrier layer effect is not obtained. Accordingly, it is considered necessary to provide a stress peak by adding some additive to the outer cladding layer as well and giving a viscosity difference in the layer.

Examples of the additive include chlorine (Cl) and F. Cl increases the refractive index of the cladding, and thus the refractive index of the cladding may exceed the refractive index of the core and light may leak to the cladding. In a case where the amount of Cl addition (that is, the Cl concentration in the cladding) exceeds 5000 ppm, the viscosity of the outer cladding layer decreases and tensile stress is applied to the core. Accordingly, the amount of Cl addition can be set to 5000 ppm or less. It should be noted that the Cl concentration in the present disclosure is expressed as a mass fraction of Cl, that is, the ratio of the mass of Cl to the total mass. The amount of Cl addition may also be 3000 ppm or less. In this case, a stressed portion to which a higher tensile stress has been applied can be formed on the outer cladding layer. However, as will be described later, a stressed portion capable of transmission loss reduction can be formed by providing a concentration difference of 100 ppm or more in the outer cladding layer.

In some cases, a heating process of reheating a fiber in a heating furnace after the fiber is discharged out of a drawing furnace in the drawing process is carried out for the purpose of transmission loss reduction (see Japanese Unexamined Patent Publication No. 2014-114195). According to such a heating process, the stressed portion may be melted again and tensile stress may be applied to the core particularly in a case where the stressed portion is formed only outside the radial middle of the outer cladding layer. Accordingly, the stressed portion can be formed inside the radial middle of the outer cladding layer.

Figure 7B:
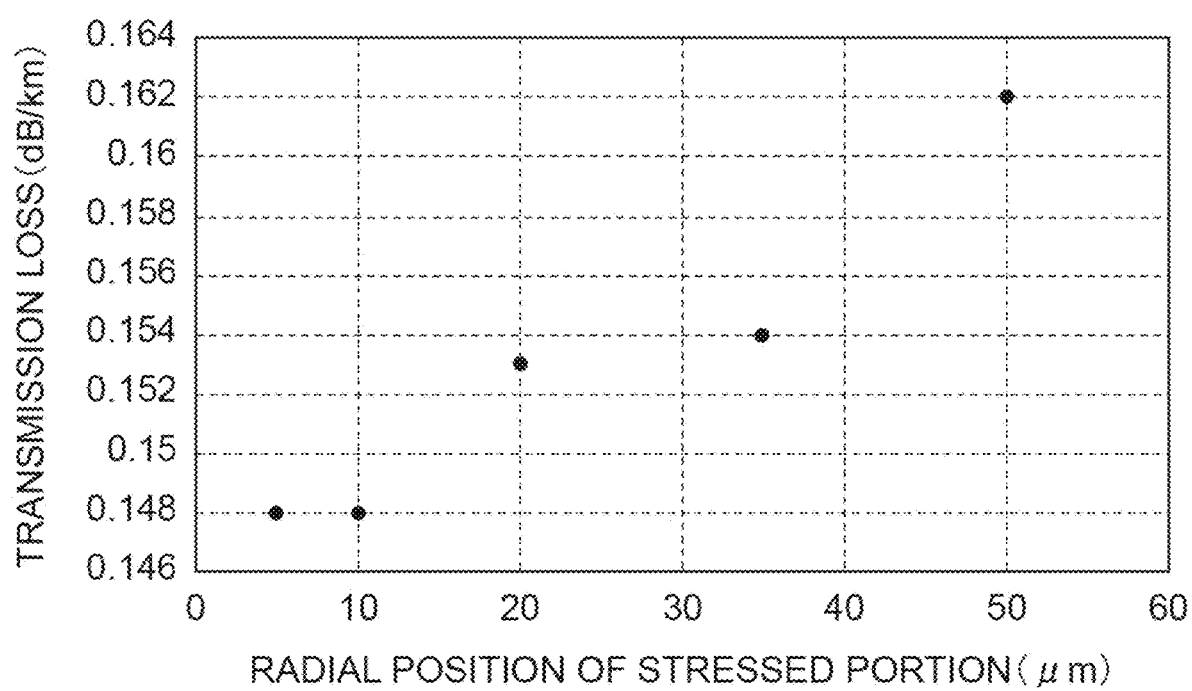
FIG. 7B is a graph showing the relationship between the radial position of the stressed portion and the transmission loss at a wavelength of 1550 nm.

FIG. 7A is a table showing the relationship between the radial position of the stressed portion and the transmission loss at a wavelength of 1550 nm. FIG. 7B is a graph showing the relationship. The radial position is specified by the radial distance between the stressed portion and the inner circumferential surface of the outer cladding layer. The position of the stressed portion is, for example, the position where the residual stress is a tensile stress and becomes local maximum. Here, the radial thickness of the outer cladding layer (thickness of the outer cladding layer) is 50 μm.

As shown in FIGS. 7A and 7B, the transmission loss deteriorates as the radial distance increases when the radial distance between the stressed portion and the inner circumferential surface of the outer cladding layer exceeds 10 μm. The transmission loss sharply deteriorates particularly in a case where the stressed portion exists within a range of 10 μm or less in the radial direction from the outer circumferential surface of the outer cladding layer (range where the radial distance between the stressed portion and the inner circumferential surface of the outer cladding layer is 40 μm or more and 50 μm or less). It is conceivable that this is because tensile strain occurs in the core by the stressed portion being re-dissolved and the residual stress in the stressed portion being released in the heating process.

The thickness of the outer cladding layer is a value optimized by the thickness and the refractive index of the inner cladding layer and is not limited to 50 μm. However, as the thickness of the outer cladding layer increases, the region where the concentration of F as an additive is low widens and thus low-cost fiber production is possible. Meanwhile, in a case where the cladding outer diameter is fixed at 125 μm with the thickness of the outer cladding layer exceeding 60 μm, the stressed portion approaches the core, and thus the spread of the signal light propagating in the core partially reaches the stressed portion. Accordingly, the transmission loss may deteriorate by being affected by the glass defect loss generated in the stressed portion. The stressed portion is melted again by the heating process in a case where the thickness of the outer cladding layer is less than 10 μm. Accordingly, the thickness of the outer cladding layer needs to be 10 μm or more.

In a case where the same study was conducted with the thickness of the outer cladding layer at 60 μm, the transmission loss did not deteriorate until the radial distance between the stressed portion and the inner circumferential surface of the outer cladding layer was 15 μm. From this, it is presumed that transmission loss deterioration can be suppressed regardless of the thickness of the outer cladding layer in a case where the radial distance is less than 10 μm.

Figure 8B:
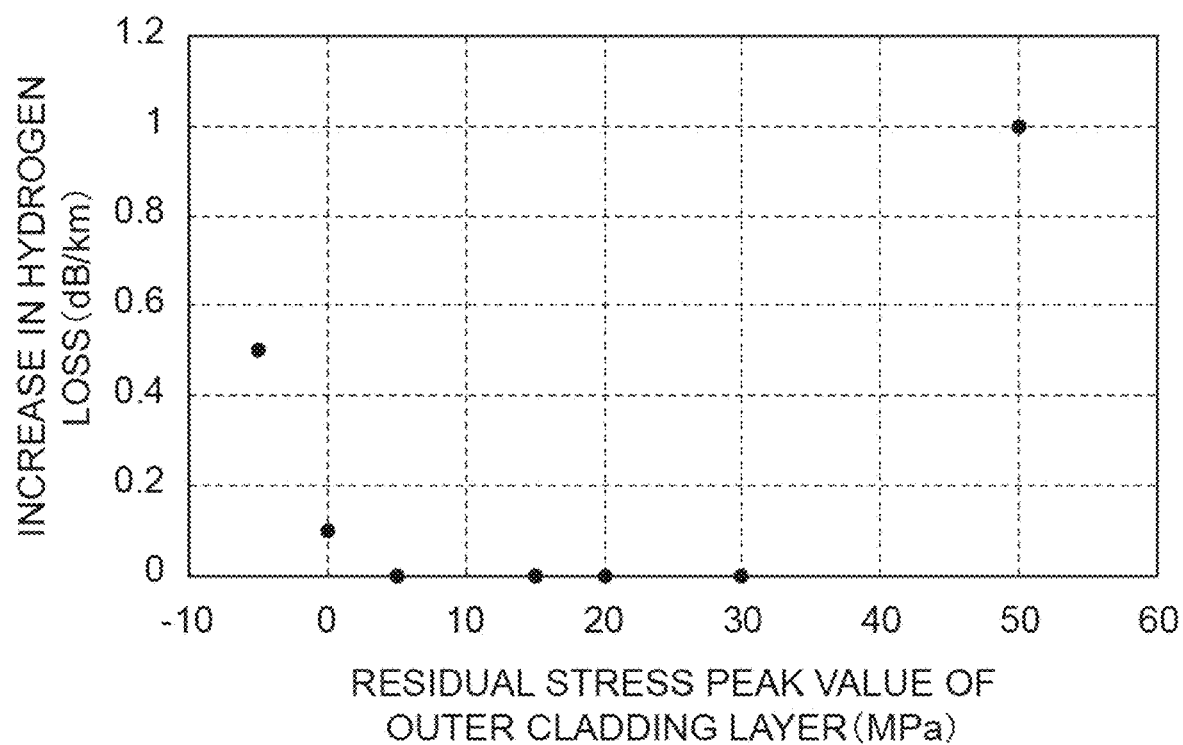
FIG. 8B is a graph showing the relationship between the peak value of the residual stress in the outer cladding layer and the increase in hydrogen loss.

FIG. 8A is a table showing the relationship between a peak value of the residual stress in an outer cladding layer and an increase in hydrogen loss. FIG. 8B is a graph showing the relationship. The peak value (local maximum value) of the residual stress in the outer cladding layer is the residual stress in the stressed portion. The increase in hydrogen loss is a change in transmission loss (absorption loss) at a wavelength of 1380 nm before and after a hydrogen deterioration test. In the hydrogen deterioration test, the optical fiber is exposed for 24 hours to an atmosphere containing hydrogen gas 1 kPa in partial pressure at a temperature of 80° C. Here, the outer cladding layer starts at a position where the radial distance from the core is 30 μm. The stressed portion is provided at a position where the radial distance from the inner circumferential surface of the outer cladding layer is 10 μm or less.

As shown in FIGS. 8A and 8B, hydrogen deterioration is significantly suppressed when the peak value (local maximum value) becomes 0 MPa or more. Further, the hydrogen deterioration declines to an unmeasurable level when the peak value becomes 5 MPa or more. Meanwhile, the transmission loss deteriorates when the peak value exceeds 30 MPa. It is presumed that this is because the amount of glass defect generation becomes excessive as the tensile stress is excessive. In other words, it is presumed that this is because the slightly spread signal light is affected by a defect loss and the transmission loss deteriorates even in a case where the radial distance of the outer cladding layer from the core is 30 μm.

A cladding layer having a plurality of different refractive indexes is formed by, for example, performing sintering after forming a soot body by spraying glass fine particles onto a glass rod of an inner cladding layer including a core. However, in this method, moisture derived from the burner flame used during the soot body formation is added to the surface of the glass rod after preform synthesis. In the drawing process, this moisture is diffused in the direction of the outer cladding layer as well, and thus the OH concentration near the interface between the inner cladding layer and the outer cladding layer may increase. In a case where such a preform is drawn, the viscosity near the interface decreases locally. Accordingly, the residual stress on the inner circumferential surface side decreases in the outer cladding layer.

Figure 9A:
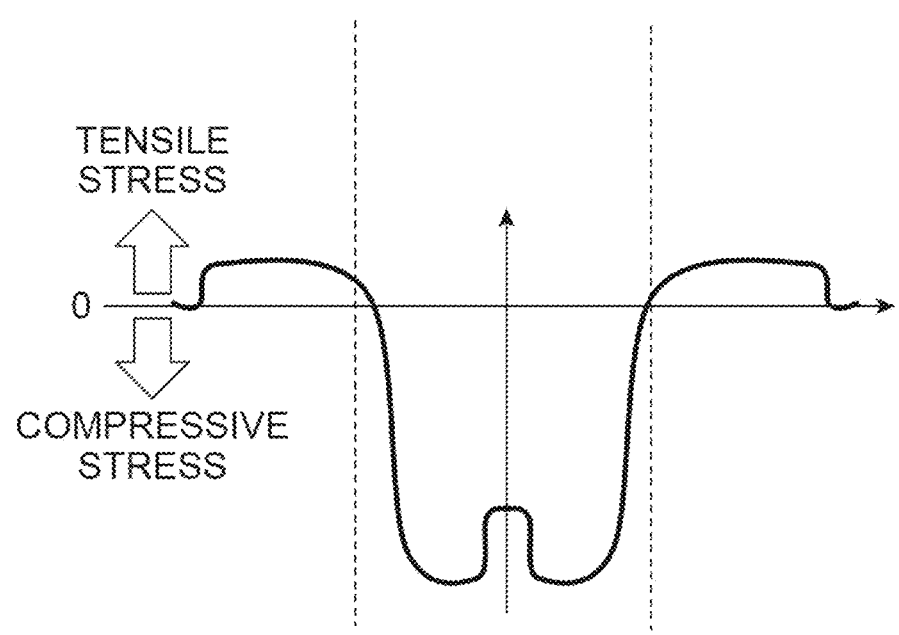
FIG. 9A shows the residual stress distribution in an optical fiber in which the interface between its inner and outer cladding layers has an OH concentration of 10 ppm or more.
Figure 9B:
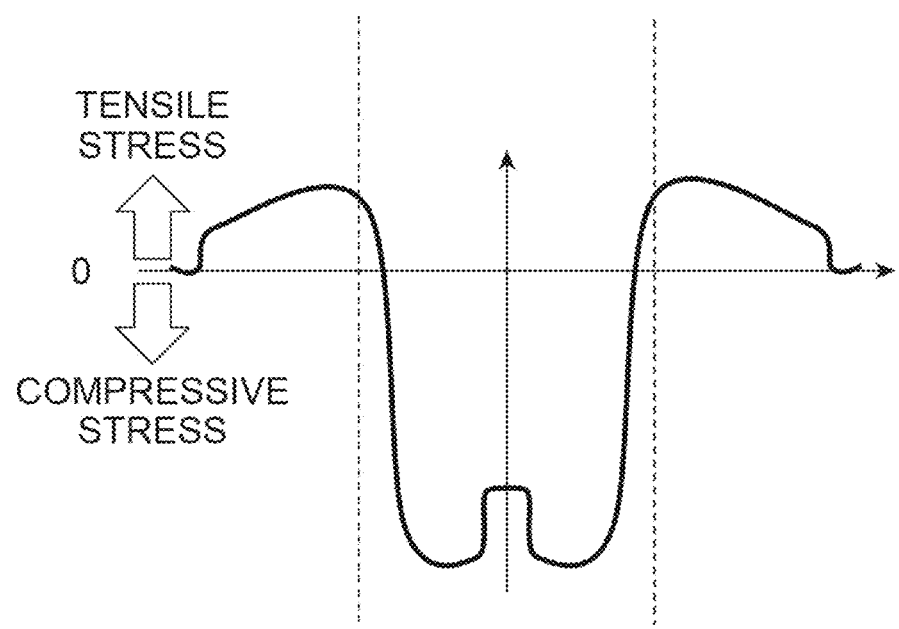
FIG. 9B shows the residual stress distribution in an optical fiber in which the interface between its inner and outer cladding layers has an OH concentration of less than 1 ppm.

FIG. 9A shows the residual stress distribution in an optical fiber in which the interface between its inner and outer cladding layers has an OH concentration of 10 ppm or more. FIG. 9B shows the residual stress distribution in an optical fiber in which the interface between its inner and outer cladding layers has an OH concentration of 1 ppm or less. In FIGS. 9A and 9B, a broken line indicates the position of the interface with + indicating tensile stress and − indicating compressive stress with regard to residual stress.

The optical fiber of FIG. 9B was obtained by applying an outer cladding layer to which F was added in advance by a collapse method to synthesize the fiber preform and drawing the fiber preform without performing the cladding layer by a sooting method. In the synthesis of the fiber preform by the collapse method, a glass pipe to which F was added in advance was prepared first and a glass rod of the inner cladding layer including a core portion was inserted into the glass pipe. Subsequently, the glass pipe and the glass rod were integrated by collapse during evacuation and the fiber preform containing K in the core portion was synthesized. The glass rod of the inner cladding layer including the core portion may be inserted into the glass pipe and simultaneously integrated and drawn without synthesizing the fiber preform by the collapse method.

In the optical fiber of FIG. 9A, the residual stress decreases near the interface and the residual stress in the outer cladding layer monotonically decreases toward the inner cladding layer. Meanwhile, on the outer cladding layer in the optical fiber of FIG. 9B, a stressed portion is formed at a position where the radial distance from the inner cladding layer is within 10 μm.

Figure 10B:
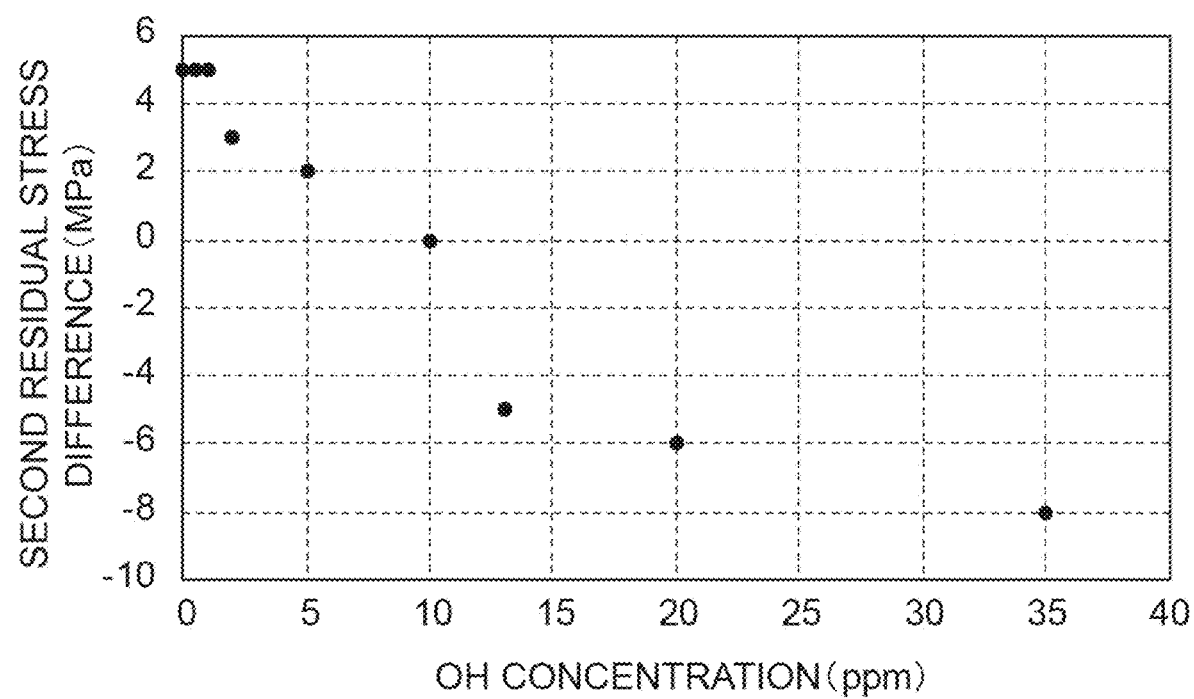
FIG. 10B is a graph showing the relationship between the OH concentration in the first region and the second residual stress difference.

FIG. 10A is a table showing the relationship between the OH concentration in the first region and a second residual stress difference. FIG. 10B is a graph showing the relationship. The second residual stress difference is the difference between the residual stress in the first region and the residual stress in the central portion of the outer cladding layer in the thickness direction (value obtained by subtracting the residual stress in the central portion of the outer cladding layer in the thickness direction from the residual stress in the first region). Here, the thickness of the outer cladding layer is 60 μm. The OH concentration was taken by microscopic infrared spectroscopy as the average value of spots with a diameter of approximately 10 μm.

As shown in FIGS. 10A and 10B, the second residual stress difference becomes a negative value in a case where the OH concentration in the first region exceeds 10 ppm. In other words, the residual stress in the first region becomes smaller than the residual stress in the central portion of the outer cladding layer in the thickness direction and a stressed portion cannot be formed in the first region. Meanwhile, in a case where the OH concentration in the first region was 1 ppm or less, the second residual stress difference was not affected by the OH concentration and was constant at 5 MPa. In other words, the residual stress in the first region was larger by 5 MPa than the residual stress in the central portion of the outer cladding layer in the thickness direction. In addition, the second residual stress difference was 2 MPa or more in a case where the OH concentration in the first region was 5 ppm or less. In other words, the residual stress in the first region was larger by at least 2 MPa than the residual stress in the central portion of the outer cladding layer in the thickness direction.

Figure 11B:
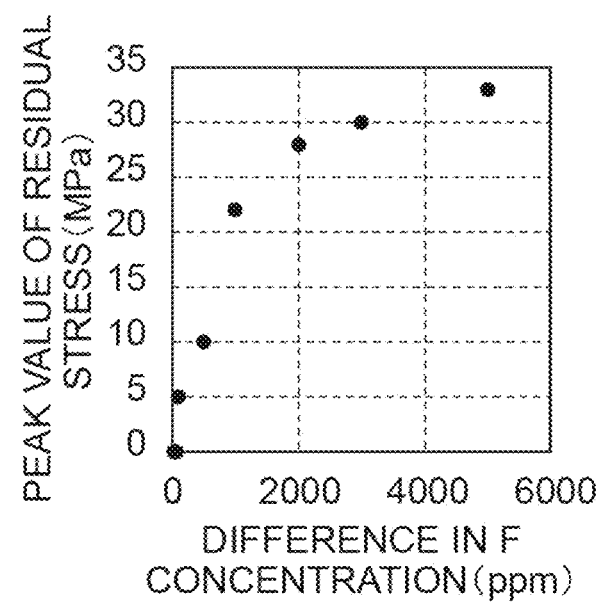
FIG. 11B is a graph showing the relationship between the difference in fluorine concentration and the peak value of the residual stress.

FIG. 11A is a table showing the relationship between a difference in F concentration, the peak value of residual stress, and the transmission loss at 1550 nm. FIG. 11B is a graph showing the relationship between the difference in F concentration and the peak value of the residual stress.

Figure 11C:
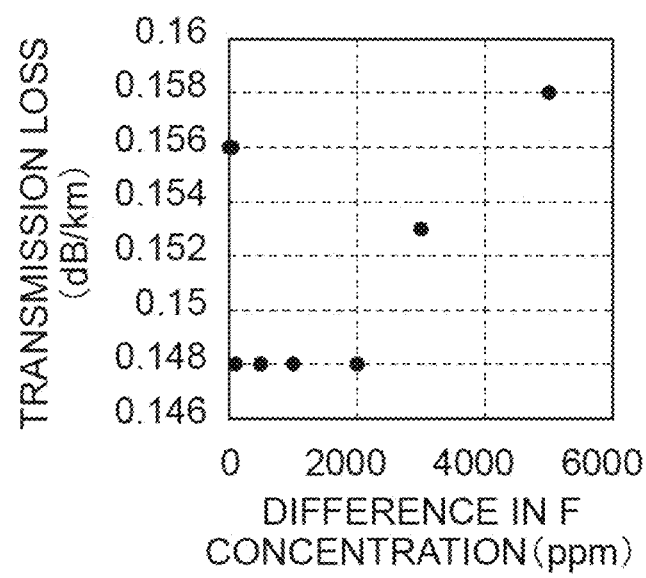
FIG. 11C is a graph showing the relationship between the difference in fluorine concentration and the transmission loss at 1550 nm.

FIG. 11C is a graph showing the relationship between the difference in F concentration and the transmission loss at 1550 nm. The difference in F concentration is the difference between the minimum value of the F concentration in a region less than 3 μm away in the radial direction from the inner circumferential surface of the outer cladding layer and the F concentration at a position 3 μm away in the radial direction from the inner circumferential surface of the outer cladding layer (value obtained by subtracting the minimum value of the F concentration in a region less than 3 μm away in the radial direction from the inner circumferential surface of the outer cladding layer from the F concentration at a position 3 μm away in the radial direction from the inner circumferential surface of the outer cladding layer). The peak value of the residual stress is the peak value of the residual stress in the first region. The interface between the inner cladding layer and the outer cladding layer had an OH concentration of 1 ppm or less.

As shown in FIGS. 11A to 11C, the peak value of the residual stress reached 5 MPa or more and the transmission loss also showed a low value in a case where the difference in F concentration was 100 ppm or more. Meanwhile, the peak value of the residual stress reached 30 MPa or more and the transmission loss deteriorated sharply in a case where the difference in F concentration was 3000 ppm or more.

F is a dopant that reduces the viscosity of glass. Accordingly, a stressed portion cannot be formed in the first region of the outer cladding layer in a case where the F concentration in the cladding has a monotonically increasing distribution toward the central axis of the optical fiber. In order to form a stressed portion in the first region, the F concentration needs to be lower in the first region than in the other regions of the outer cladding layer. In a case where the diameter of the region where the F concentration is low exceeds 3 μm, it is conceivable that not only the residual stress but also the peak of the relative refractive index difference itself shows a signal confinement action as in the case of the core and signal transmission characteristics are affected in the form of an increase in cutoff wavelength, bending loss deterioration, and so on. Accordingly, the diameter of the region where the F concentration is low needs to be 3 μm or less. In addition, the minimum value of the F concentration in the region where the F concentration is low needs to be lower by at least 100 ppm than the minimum value of the F concentration in the region outside the region.

Figure 12B:
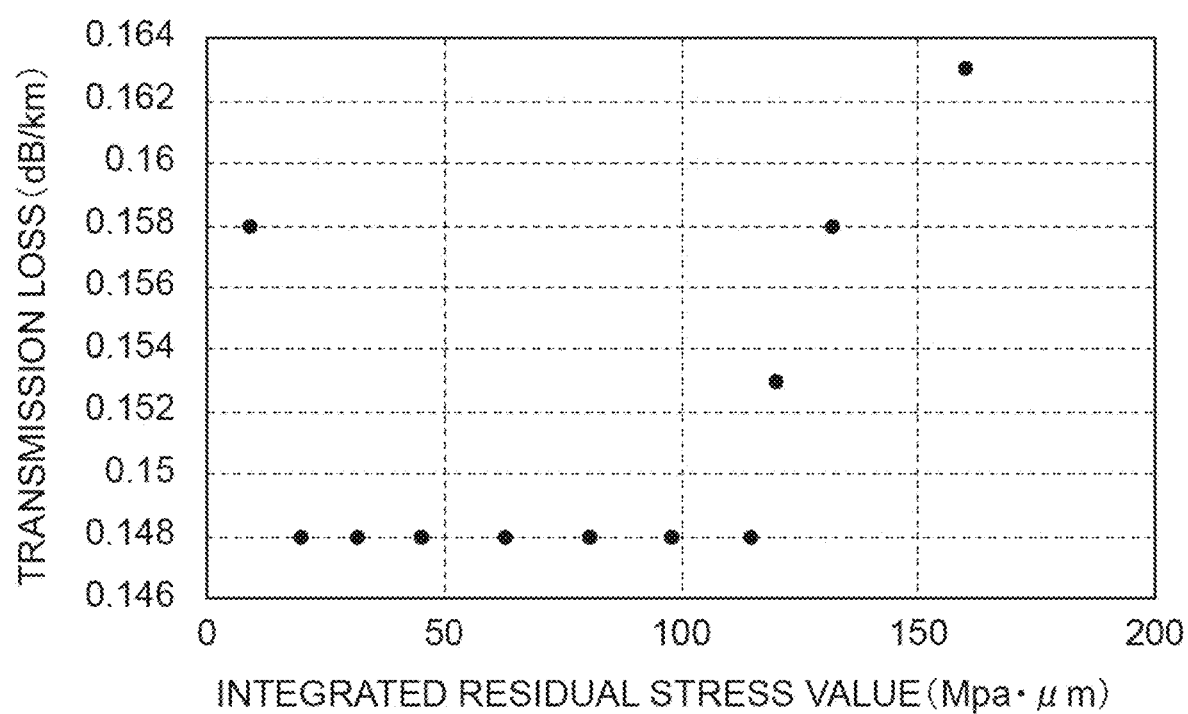
FIG. 12B is a graph showing the relationship between the integrated residual stress value and the transmission loss.

FIG. 12A is a table showing the relationship between an integrated residual stress value and the transmission loss. FIG. 12B is a graph showing the relationship. As shown in FIGS. 12A and 12B, a sufficient stressed portion can be formed and the transmission loss can be kept low in a case where the integrated residual stress value is 20 MPa·μm or more. Meanwhile, it can be seen that the transmission loss deteriorates again in a case where the integrated residual stress value is 120 MPa·μm or more. It is presumed that this is because the strain of the stressed portion becomes excessive to result in deterioration of the transmission loss derived from a defect loss.

Assuming that the graph of the residual stress $P(r)$ in the above integration section ($r1 \leq r \leq r2$) is formed into a triangular shape connecting $P(r1)$, a peak value $P$ of $P(r)$, and $P(r2)$ with a straight line, and the peak value is 30 MPa, the integrated value calculated is 150 MPa·μm and 120 MPa·μm or more. It should be noted that r2 represents a position 10 μm away from the inner surface of the outer cladding layer and r1 is a position where $P(r1)$ is equal to $P(r2)$.

It is presumed that the integrated value is 120 MPa·μm or more as described above because there is no sudden change in stress and the stressed portion is insufficient in the event of an exponent α that is 1 or more and a distribution in which the integrated value exceeds the area of the triangle in a case where the residual stress distribution around a radius $r_{max}$ giving a local maximum value $P_{max}$ of the residual stress is approximated by the following Expression (3). Accordingly, α can be less than 1 as the distribution shape of the stressed portion. As described above, the stressed portion needs to define not only a value such as the peak value but also the distribution of the exponent α and the area value (that is, the integrated value). It should be noted that a in Expression (3) is the radial distance 10 (μm) between the upper limit position of the integration section and the inner circumferential surface 22b and b is represented by the following Expression (4).

[Expression 3]

$$P(r')=P_{max} \cdot (1-b \cdot [(r-r_{max})a]^\alpha) \quad (3)$$

[Expression 4]

$$b=(1-[P(r1)/P_{max}]) \cdot [a/(r1-r_{max})]^\alpha \quad (4)$$

REFERENCE SIGNS LIST

1: optical fiber, 10: core, 10a: outer circumferential surface, 20: cladding, 20a: outer circumferential surface, 20b: inner circumferential surface, 21: inner cladding layer, 21a: outer circumferential surface, 21b: inner circumferential surface, 22: outer cladding layer, 22a: outer circumferential surface, 22b: inner circumferential surface, 30: local maximum portion.

The invention claimed is:

1. An optical fiber having a structure uniform in a longitudinal direction, the optical fiber comprising:
   a core including a silica glass containing an alkali metal element; and
   a cladding including a silica glass and surrounding the core in a cross-section perpendicular to the longitudinal direction, wherein
   a refractive index of the cladding is lower than a refractive index of the core,
   the cladding includes, in the cross-section, an inner cladding layer having a circular ring shape and including an inner circumferential surface of the cladding, and an outer cladding layer having a circular ring shape and including an outer circumferential surface of the cladding,
   the inner cladding layer contains fluorine,
   the inner and outer cladding layers have refractive indexes different from each other,
   the outer cladding layer includes a local maximum portion where a residual stress, which is a tensile stress, becomes local maximum,
   a radial distance between the local maximum portion and an inner circumferential surface of the outer cladding layer is 10 μm or less, and
   a value obtained by integrating a residual stress expressed as a function of a radial distance from a central axis of the optical fiber over the radial distance in a section between an upper limit position and a lower limit position sandwiching the local maximum portion is 20 MPa·μm or more and less than 120 MPa·μm, a distance from the inner circumferential surface of the outer cladding layer being 10 μm at the upper limit position and a residual stress equal to a residual stress at the upper limit position being given at the lower limit position.

2. The optical fiber according to claim 1, wherein an increase in transmission loss at a wavelength of 1380 nm resulting from 24-hour exposure to an atmosphere containing hydrogen gas 1 kPa in partial pressure at a temperature of 80° C. is 0.0001 dB/km or more and 0.1 dB/km or less.

3. The optical fiber according to claim 1, wherein the residual stress in the local maximum portion is a tensile stress of 5 MPa or more and 30 MPa or less.

4. The optical fiber according to claim 1, wherein the local maximum portion is provided at a position where the radial distance from the outer circumferential surface of the core is 60 μm or less.

5. The optical fiber according to claim 1, wherein a fluorine concentration in the cladding is 1000 ppm or more and 100000 ppm or less.

6. The optical fiber according to claim 1, wherein a relative refractive index difference between the core and the inner cladding layer is 0.2% or more.

7. The optical fiber according to claim 1, wherein a residual stress in the core is higher than a residual stress in the inner cladding layer.

8. The optical fiber according to claim 1, wherein a residual stress in the core is a compressive stress.

9. The optical fiber according to claim 1, wherein a residual stress in the core minus a residual stress in the inner cladding layer is 15 MPa or less.

10. The optical fiber according to claim 1, wherein the core contains potassium as the alkali metal element.

11. The optical fiber according to claim 1, wherein the cladding contains chlorine, and a chlorine concentration in the cladding is 5000 ppm or less.

12. The optical fiber according to claim 11, wherein the chlorine concentration in the cladding is 3000 ppm or less.

13. An optical fiber having a structure uniform in a longitudinal direction, the optical fiber comprising:
    a core including a silica glass containing an alkali metal element; and
    a cladding including a silica glass and surrounding the core in a cross-section perpendicular to the longitudinal direction, wherein
    a refractive index of the cladding is lower than a refractive index of the core,
    the cladding includes, in the cross-section, an inner cladding layer having a circular ring shape and including an inner circumferential surface of the cladding, and an outer cladding layer having a circular ring shape and including an outer circumferential surface of the cladding,
    the inner cladding layer contains fluorine,
    the inner and outer cladding layers have refractive indexes different from each other,
    the outer cladding layer includes a local maximum portion where a residual stress, which is a tensile stress, becomes local maximum,
    a radial distance between the local maximum portion and an inner circumferential surface of the outer cladding layer is 10 μm or less,
    the outer cladding layer includes a first region including the inner circumferential surface of the outer cladding layer,
    the first region has a radial thickness of 10 μm, and
    the first region has an OH concentration of 5 ppm or less.

14. An optical fiber having a structure uniform in a longitudinal direction, the optical fiber comprising:
    a core including a silica glass containing an alkali metal element; and
    a cladding including a silica glass and surrounding the core in a cross-section perpendicular to the longitudinal direction, wherein a refractive index of the cladding is lower than a refractive index of the core, the cladding includes, in the cross-section, an inner cladding layer having a circular ring shape and including an inner circumferential surface of the cladding, and an outer cladding layer having a circular ring shape and including an outer circumferential surface of the cladding, the inner cladding layer contains fluorine, the inner and outer cladding layers have refractive indexes different from each other, the outer cladding layer includes a local maximum portion where a residual stress, which is a tensile stress, becomes local maximum, a radial distance between the local maximum portion and an inner circumferential surface of the outer cladding layer is 10 μm or less, the outer cladding layer includes a second region including the inner circumferential surface of the outer cladding layer, the second region has a radial thickness of 0.1 μm or more and less than 3 μm, and a fluorine concentration in the second region is lower by 100 ppm or more and 10000 ppm or less than a fluorine concentration in a region of the outer cladding layer other than the second region.

\* \* \* \* \*